Patented Sept. 22, 1931

1,824,177

UNITED STATES PATENT OFFICE

ARNOLD M. TAYLOR AND ARTHUR R. CHAPMAN, OF STAMFORD, CONNECTICUT, ASSIGNORS TO ATLAS POWDER COMPANY, OF WILMINGTON, DELAWARE, A CORPORATION OF DELAWARE

PROCESS FOR PRODUCTION OF PIGMENTED PYROXYLIN COMPOSITIONS

No Drawing.   Application filed July 28, 1924.   Serial No. 728,719.

Our invention relates particularly to the production of pigmented pyroxylin compositions commonly called lacquer enamels, which, when applied by the usual methods, spray, dip, etc., produce films which have a high gloss, and our invention is applicable to the use of such compositions in connection with many different industries although it is especially applicable for use in connection with the manufacture of pigmented pyroxylin compositions, artificial leather, patent leather, etc.

It is well known that in the manufacture of pigmented pyroxylin compositions, where pigments are ground in the usual way with nitrocellulose solutions, the resulting films dry with a flat or dull surface if sufficient pigment has been used to produce a satisfactory product. However, we have found that a pigmented pyroxylin composition containing the usual amount of pigment that is used in obtaining a flat or dull surface when manufactured in the usual way, can be prepared so that a high gloss results when the resulting film dries, without sacrificing other desirable qualities such as high strength, durability, etc.

We produce a pigmented pyroxylin composition or lacquer enamel with a high gloss by first wetting the pigment with an hygroscopic organic liquid such as anhydrous ethyl alcohol and agitating by any suitable means until the pigment has been thoroughly wetted. By so doing, we find that a much greater degree of dispersion of the pigment is accomplished and there is practically no tendency for the pigment particles to clump together or flocculate.

If we should use an organic solvent which is non-hygroscopic, as butyl acetate, to accomplish our purpose, we would find that as soon as the pigment was wetted by this solvent, the pigment particles would clump together or flocculate, showing that the dispersion of the pigment was far from complete. If this pigment which has been wetted with a non-hygroscopic organic liquid is incorporated into a pyroxylin composition or nitrocellulose solution, the resulting film would dry with a dull, flat and rough surface. If the pigment which has been wetted with a hygroscopic organic liquid is incorporated into a pyroxylin composition or nitrocellulose solution, the dried film made from this product has a very high gloss.

The wetting of a pigment by an hygroscopic organic liquid prevents the clumping or flocculation of the pigment. We attribute this condition to the absorption of moisture surrounding the pigment particles by an hygroscopic organic liquid and thus secure maximum wetting power of the pigment.

While our invention is capable of being carried out in different ways, for the purpose of illustration we shall describe only one embodiment thereof.

A sufficient quantity of an hygroscopic organic liquid, as anhydrous ethyl alcohol, is added to a definite amount of pigment such as zinc oxide in order to completely wet the pigment. When this condition is reached, the mass is agitated by any suitable means in order to secure the greatest dispersion of the pigment particles. When the agitation is complete, the resulting mass which consists of the pigment and the hygroscopic organic liquid, is incorporated into a suitable pyroxylin composition or nitrocellulose solution to form a pigmented pyroxylin composition or lacquer enamel. The films which are made from this pigmented pyroxylin composition or lacquer enamel have a very high gloss. It has not been possible heretofore to obtain by the ordinary practices of manufacturing, products which have a high gloss, nor has it been possible to obtain these results by the use of a non-hygroscopic solvent such as butyl acetate.

While we have mentioned anhydrous ethyl alcohol as an organic liquid which will efficiently serve the purpose sought, other agencies may be used in lieu thereof, such for example as dry ethyl oxalate, dry ethyl acetate, dry acetone, dry methyl acetate, dry ethyl glycol, dry methyl alcohol, dry diacetone alcohol, dry ethyl lactate, dry isopropyl-alcohol or any mixtures of these.

It is possible to produce a product of high gloss by sacrificing such vital qualities as hiding power, covering power, flexibility or durability, but with our process we obtain a product of high gloss without sacrificing any of these vital properties.

While we have described our invention in detail, we wish to be understood that many changes may be made therein without departing from the spirit of our invention.

We claim:

1. The herein described process of preparing a lacquer enamel which will dry with a high gloss, which consists of employing a moisture bearing pigment and designedly absorbing the moisture therefrom by wetting the same with an anhydrous and highly hygroscopic organic liquid, and thereafter incorporating the wetted pigment in a nitrocellulose solution.

2. The herein described process of preparing a nitrocellulose lacquer enamel, adapted to dry with a high gloss, which consists of employing a moisture bearing pigment, wetting the same with absolute ethyl alcohol to thereby absorb the entrained moisture content, and thereafter mixing the wetted pigment with a nitrocellulose solution, comprising a solvent with which the said ethyl alcohol is miscible.

3. The herein described process of preparing a lacquer enamel, which will dry with a high gloss, which consists of freeing the pigment content of the lacquer from its contained moisture by pre-wetting the same with an anhydrous and highly hygroscopic organic liquid alone, and thereafter incorporating the dehydrated pigment in a nitrocellulose solution.

In testimony whereof they affix their signatures.

ARNOLD M. TAYLOR.
ARTHUR R. CHAPMAN.